March 17, 1953  H. B. HOLMES ET AL  2,631,396
ARTIFICIAL FLOWER
Filed Sept. 10, 1951  2 SHEETS—SHEET 1
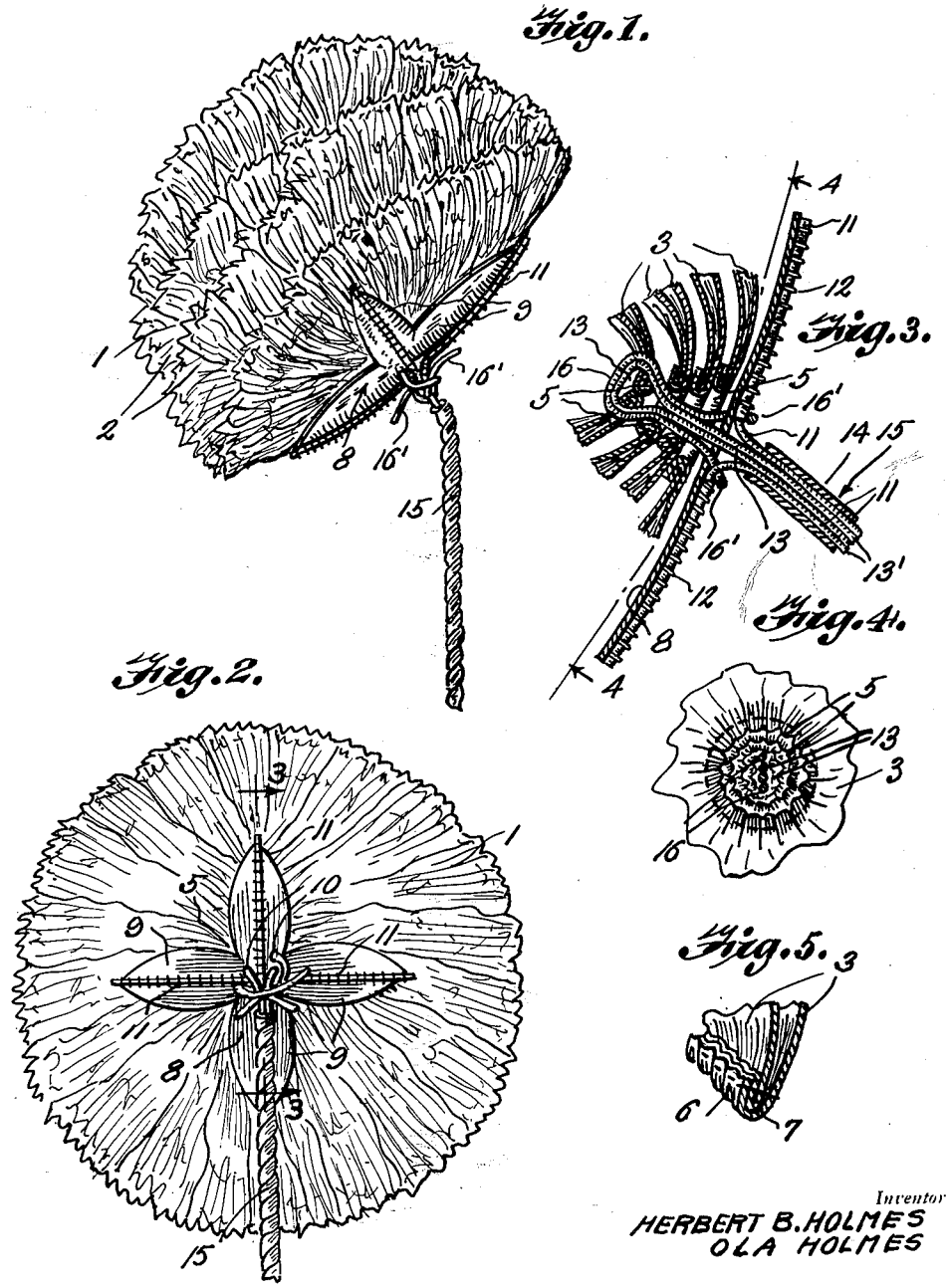
Inventors
HERBERT B. HOLMES
OLA HOLMES
Attorneys March 17, 1953 H. B. HOLMES ET AL 2,631,396
ARTIFICIAL FLOWER
Filed Sept. 10, 1951 2 SHEETS—SHEET 2

INVENTORS
HERBERT B. HOLMES
OLA HOLMES
BY
Ross J. Woodward
ATTORNEY

UNITED STATES PATENT OFFICE 2,631,396

ARTIFICIAL FLOWER

Herbert B. Holmes and Ola Holmes, Marfa, Tex.

Application September 10, 1951, Serial No. 245,784

2 Claims. (Cl. 41—13)

This invention relates to artificial flowers and it is one object of the invention to provide an artificial flower which is formed of thin waterproof plastic material which will successfully withstand being wet by rain and may be washed with a hose without being damaged.

Another object of the invention is to provide an artificial flower having its petals and calyx formed of thin plastic sheet material, the petals being so formed that they will be strongly reinforced and will not be liable to be torn when subjected to strong wind in case they are roughly handled.

Another object of the invention is to provide an artificial flower wherein the petals are very firmly secured one against another to form a complete flower by wires and also firmly secured against the calyx which in its turn is reinforced by wires having portions extending from the calyx and forming a stem for the flower.

Another object of the invention is to provide an artificial flower wherein certain of the wires which secure the petals one upon another have end portions projecting from the calyx so that by pulling upon the ends thereof the wire may be tightened and the petals held tightly in place.

Another object of the invention is to provide an artificial flower which is very attractive and lifelike in appearance.

The invention is illustrated in the accompanying drawings wherein:

Figure 1 is a side view of an artificial flower formed in accordance with this invention and representing a peony.

Figure 2 is a rear view of the artificial flower shown in Figure 1.

Figure 3 is a fragmentary sectional view upon an enlarged scale taken along the line 3—3 of Figure 2.

Figure 4 is a sectional view taken along the line 4—4 of Figure 3.

Figure 5 is a view upon an enlarged scale showing the manner in which inner edge portions of petal-forming sheets are finished.

Figure 6:
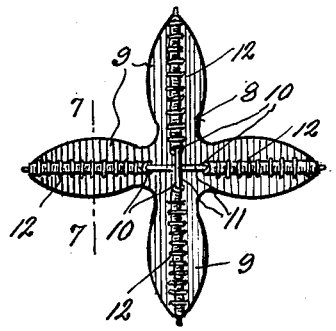
Figure 6 is a view of the calyx before being assembled with the petal-forming sheets of material.

The artificial flower 1 shown in Figures 1 and 2 represents a peony and has a multiplicity of petals 2 formed from a plurality of sheets 3 of thin sheet material which are pliable plastic and are of circular shape and formed with notched edges in order to impart a natural appearance to the flower. The sheets are of progressively reduced diameter. Each of the thin plastic sheets is formed with a central opening 5 between these center openings and their marginal edges the sheets of plastic are crimped radially, the crimps cooperating with the notched edges of the sheets to cause artificial peonies formed in accordance with the invention to have a very realistic appearance. Referring to Figure 3 it will be seen that the center openings 5 of the sheets of plastic are progressively reduced in size from the rear sheet to the front one. It should also be noted that when preparing the sheets of thin plastic two sheets are placed against each other and have their inner marginal edges about their center openings folded outwardly and back upon themselves to form reinforcements 6 which are secured by stitching 7. Center portions of the sheets of plastic will thus be prevented from tearing easily.

Figure 7:
Figure 7 is a sectional view taken along the line 7—7 of Figure 6.

The sheets forming the petals are backed up and reinforced by a calyx 8 which is also formed of thin plastic. This calyx has a central portion and radiating arms 9 which taper towards their outer ends, as shown in Figure 6. Openings 10 are formed through the central portion of the calyx and through these openings are passed wires 11. The wires extend longitudinally of the arms 9 midway the width thereof and portions of the plastic material are folded about the wires transversely thereof and secured by stitching 12 applied in loops about the enclosed wires, as shown in Figure 7. The wires 10 are of considerably greater length than the arms of the calyx and their portions projecting from inner ends of the arms are bent so that they extend rearwardly from the calyx, as shown in Figure 3, and form a portion of the stem of the flower.

When forming the artificial peony the sheets of thin plastic forming the petals are placed one against another and a wire 13 then doubled midway its length and its end portions then passed rearwardly through the pair of front sheets 3 at opposite sides of its center opening and through the center openings of the remaining plastic sheets, and also through the calyx, the wire 13 being of such length that its end portions 13' may extend rearwardly in close proximity to the wires 11 and the wires 11 and 13 then all wrapped in a plastic binding 14 and form a stem 15 for the flower. The plastic material used for the binding 14 is of a green color so that the stem of the flower is green and has a natural appearance. There has also been provided a tie wire 16 which is doubled midway its length and has its end portions passed through the front plastic and through the center openings of the other plastic sheets and through the center portion of the calyx, protruding ends 16' of this wire being pulled upon to tightly bind the petal-forming sheets and the calyx together and twisted together to hold the bridge portion of the binding wire in tight pressing engagement with the front petal-forming sheet.

Figure 9:
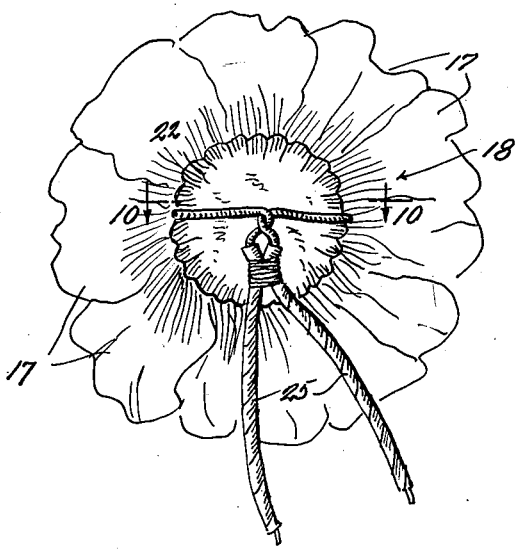
Figure 9 is a rear view of the artificial rose shown in Figure 8.
Figure 8:
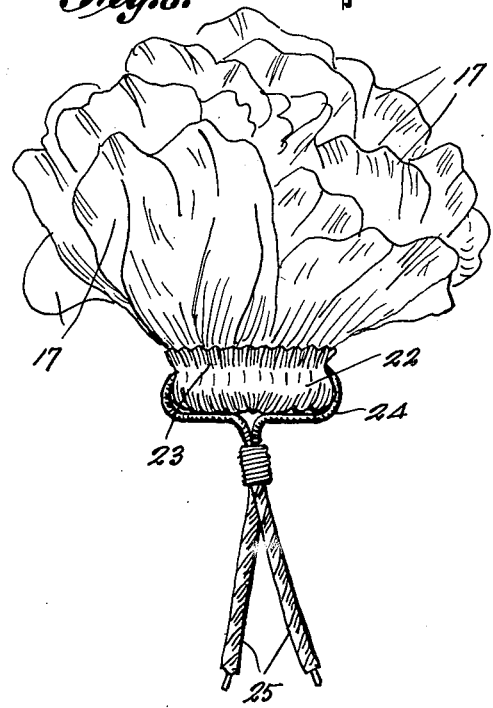
Figure 8 is a side view of an artificial flower representing a rose.
Figure 10:
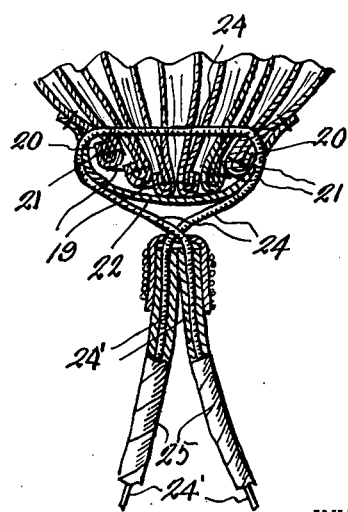
Figure 10 is a sectional view taken along the line 10—10 of Figure 9.

The artificial rose illustrated in Figures 8, 9 and 10 has petals 17 formed from petal-forming sheets 18 of thin plastic, these sheets of plastic having their marginal portions cut to form scallops which impart the appearance of rose petals to them. The sheets 18 are formed with center openings 19, corresponding to the openings 5 of the sheets 3, and inner marginal edges about the center openings are folded to form bindings 20 secured by stitching 21. The sheets 18 are arranged in pairs before the bindings 20 are formed. The calyx 22 consists of a circular disc of thin waterproof plastic material and this sheet of plastic has its marginal portions brought upwardly and inwardly about the assembled petal-forming sheets and secured by stitching 23. A wire 24 is then passed transversely through the assembled petal-forming sheets and the calyx and its protruding end portions bent downwardly and towards each other and crossed to form portions 24' which are encased in a plastic binding 25 to form a stem for the rose, this stem being of a double formation so that by twisting its sections together the rose may be firmly secured to a rose bush or to artificial foliage.

Having thus described the invention what is claimed is:

1. An artificial flower comprising petals consisting of a plurality of thin sheets of flexible waterproof plastic material each formed with a large central opening and having a scalloped outer marginal edge, said sheets being disposed one against another and arranged in pairs having their center openings registering and inner marginal portions about the center openings folded outwardly back upon themselves and secured by stitching and thereby forming reinforced edge portions about the center openings, a calyx also formed of thin waterproof plastic material disposed against the rear one of the petal-forming sheets, and wires securing the petal-forming sheets and the calyx forming sheet in assembled relation to each other and having portions extending from the calyx and forming a stem for the flower.

2. The structure of claim 1 wherein the center openings formed in the petal-forming sheets progressively decrease in diameter from the rear sheet towards the front sheet, and wherein a wire is bent midway its length to form a bridge portion extending diametrically across the center opening of the front sheet and arms extending rearwardly from the bridge portion, the arms being passed rearwardly through perforations formed in the front sheet in radially spaced relation to its center opening and rearwardly through the center openings of the remaining petal-forming sheets with portions of the arms passing through the calyx forming sheet and twisted together back of the said calyx forming sheet to exert rearward pull upon the wire and firmly hold the petal-forming sheets and the calyx forming sheet assembled.

HERBERT B. HOLMES.
OLA HOLMES.

REFERENCES CITED

The following references are of record in the file of this patent:

UNITED STATES PATENTS

| Number | Name | Date |
|---|---|---|
| 2,344,846 | Berg | Mar. 21, 1944 |
| 2,507,899 | Gilowitz | May 16, 1950 |